United States Patent [19]
Wilson

[11] Patent Number: 6,105,359
[45] Date of Patent: Aug. 22, 2000

[54] EFFICIENCY ENHANCED TURBINE ENGINE

[76] Inventor: Michael A. Wilson, 316 N. Lakeview Dr., Lake Helen, Fla. 32744

[21] Appl. No.: 09/353,984

[22] Filed: Jul. 15, 1999

Related U.S. Application Data

[62] Division of application No. 08/829,217, Mar. 31, 1997, Pat. No. 5,966,927.

[51] Int. Cl.[7] .................................................. F02C 3/04
[52] U.S. Cl. ............................................................ 60/39.02
[58] Field of Search ............................... 60/39.02, 39.43, 60/39.34, 39.44, 39.39, 39.75, 39.38, 39.36; 415/52.1, 55.6, 58.6

[56] References Cited

U.S. PATENT DOCUMENTS

| | | | |
|---|---|---|---|
| 1,289,960 | 12/1918 | Taylor | 60/39.43 |
| 2,138,220 | 11/1938 | Trumpler | 60/39.43 |
| 2,370,217 | 2/1945 | Wright | 60/39.38 |
| 2,524,549 | 10/1950 | Theimer | 60/39.43 |
| 3,156,093 | 11/1964 | Chapman | 60/39.43 |
| 3,290,879 | 12/1966 | Wilkins | 60/39.43 |
| 3,324,799 | 6/1967 | Terrano | 415/55.6 |
| 3,685,287 | 8/1972 | Dooley | 415/52.1 |
| 3,782,108 | 1/1974 | Holste | 60/39.75 |
| 3,877,219 | 4/1975 | Hagen | 60/39.39 |
| 4,255,080 | 3/1981 | Wilson | 415/52.1 |
| 4,503,669 | 3/1985 | Geoffrey | 60/39.75 |
| 4,693,075 | 9/1987 | Sabatiuk | 60/39.43 |
| 5,966,927 | 10/1999 | Wilson | 60/39.43 |

*Primary Examiner*—Ted Kim
*Attorney, Agent, or Firm*—Robert E. Harris

[57] ABSTRACT

An efficiency enhanced turbine engine and method are disclosed for a turbine engine having a rotor and a fluid flow path that extends through compression, combustion, and expansion or turbine stages with fluid flowing through the fluid flow path driving the rotor. The turbine engine has one or more stator-rotor-stator assemblies, and use of a flat rotor disk with turbine blades provides simplicity in fabrication and operation. Increases in pressure during combustion above the pressure at the compression stage are prevented from flowing back to the compression stage and/or capturing of fluid during combustion enables elevation of the temperature and pressure while maintaining the fluid at near constant volume during combustion, both of which enhance the efficiency of the turbine engine. Fluid flow is preferably in a circumferential direction and the fluid is caused to reenter the rotor a plurality of times to provide cyclic exposure of the moving parts of the turbine engine to different portions of the engine cycle for reducing the average temperature of the moving parts and thereby allow higher compression ratios and combustion temperatures to also yield higher efficiency.

19 Claims, 7 Drawing Sheets

EFFICIENCY ENHANCED TURBINE ENGINE

RELATED APPLICATION

This application is a division of U.S. patent application Ser. No. 08/829,217 filed Mar. 31, 1997 now U.S. Pat. No. 5,966,927.

FIELD OF THE INVENTION

This invention relates to an improved and efficiency enhanced turbine engine.

BACKGROUND OF THE INVENTION

Turbine engines are now well known, and the turbine engine is now known to have several advantages not to be found in engines such as, for example, piston type internal combustion engines, although such engines have useful features not heretofore incorporated in turbine engines.

As is well known, the typical turbine engine utilizes compression and combustion stages with fluid flow established therethrough, utilizes near constant high pressure at combustion (practical usable pressures, at least in many turbine engines, are limited by reverse flow through the compressor (i.e., compressed stall) and the physical size of the several stages required to achieve the necessary high pressures), and has a primary direction of flow through the engine that is substantially parallel to the axis of rotation (circumferential components may be found in radial compressors, but these components do not provide progress of the fluid between successive stages of the engine).

It is known that the efficiency of heat engines is directly related to the operating temperatures at which heat is added, that increases in operating pressures normally also increase operating temperatures, and that heat engines can be made more efficient by constraining the fluid during the heating process, all of which enhance efficiency, and the foregoing have been found to be applicable to heat engines in which heat is added by combustion of, or in, the working fluid. While constraining of working fluid to a near constant volume during heating is common to the internal combustion engine, for example, this feature has not heretofore been utilized in now known turbine engines.

Now known turbine engines normally cannot tolerate pressure rises during combustion because of accompanying temperature rises to unacceptable levels and/or because pressure rises above the pressure at the outlet of the compressor results in pressure flow back through the compressor with such pressure back flow often stalling the compressor.

While compressor/inlet stall has been prevented in a pulse jet engine, for example, by interposing a barrier between the combustion chamber and the compressor/inlet during the combustion process to allow the temperature and pressure to rise during combustion above that provided by the compressor and thus provide an increase in operating efficiency, and while this same general concept has also been used in a piston driven internal combustion engine through use of inlet and outlet valves with the piston operated in such a manner as to provide a near fixed volume during combustion to thus provide an increase in operating efficiency, the foregoing has not heretofore been utilized in now known turbine engines.

In turbine engines, the maximum operating temperatures typically occur at the exit from the combustor, which commonly is also the inlet of the turbine portion of the engine, and the materials, or surfaces, at the turbine portion are often continuously subjected to temperatures at, or near, the maximum tolerable operating temperatures.

Since the maximum tolerable temperature strength of the materials in the turbine portion of now known turbine engines is at least one of the primary determinants of turbine efficiency, such engines are thus also now limited in efficiency by the ability of the materials in the turbine portion to withstand high temperatures (while increased efficiency in now known turbine engines could be realized by improving the high temperature strength of the material at the turbine portion, this cannot always be practically accomplished and/or is often quite an expensive undertaking).

Improvements in a turbine engine to provide efficiency enhancement not now found in the turbine engine would therefore be found useful and/or is now needed.

SUMMARY OF THE INVENTION

This invention provides an improved and efficiency enhanced turbine engine and method for a turbine engine having a rotor and a fluid flow path that extends through compression, combustion, and expansion or turbine stages with fluid flowing through the fluid flow path driving the rotor.

The turbine engine has one or more stator-rotor-stator assemblies, and, in a now preferred embodiment of this invention, a flat rotor disk with turbine blades is utilized and provides fabrication simplicity as well as simplifying establishing and maintaining clearances of the turbine blades.

Increases in pressure during combustion above the pressure at the compressor, or compression stage, are prevented from flowing back from the combustor, or combustion stage, to the compressor to thus allow higher usable pressure at the combustor and hence allow higher temperatures to be utilized during combustion which results in greater engine efficiency.

In the now preferred embodiment of this intention, fluid is substantially precluded from flowing back to the compression stage from the combustion stage by trapping fluid compressed at the compression stage between turbine blades of the rotor in a constrained flow section for achieving a valving action between the compression stage and the combustion stage to provide forward transfer of the compressed fluid without reverse flow of pressure whereby the fluid at the combustion stage is elevated in temperature and pressure while being maintained at near constant volume during combustion to provide still greater efficiency enhancement. Constant volume combustion can be further augmented by valving and/or use of a constrained flow region in the fluid path.

Fluid flow is preferably in a circumferential direction and the fluid passes, or reenters, the rotor a plurality of times to provide cyclic exposure of the moving parts of the turbine engine to different portions of the engine cycle for substantially reducing the average temperature to which the moving parts are subjected and thereby allow higher compression ratios and combustion temperatures to also yield higher efficiency.

It is therefore an object of this invention to provide an improved and energy enhanced turbine engine and method.

It is still another object of this invention to provide an improved turbine engine and method having compression, combustion, and expansion or turbine stages with fluid flow therethrough in a manner such that efficiency is enhanced.

It is still another object of this invention to provide an improved and efficiency enhanced turbine engine having a flat rotor disk.

It is still another object of this invention to provide an improved and efficiency enhanced turbine engine with one or more stator-rotor-stator assemblies with flow therein in a circumferential direction and with the fluid Reentering the rotor a plurality of times to provide exposure of the moving parts of the turbine engine to different portions of the engine cycle.

It is still another object of this invention to provide an improved and efficiency enhanced turbine engine wherein fluid flow is controlled so that pressure is substantially precluded from flowing back to the compression stage to allow higher usable pressure at the combustion stage.

It is still another object of this invention to provide and improved and energy enhanced turbine engine wherein fluid at the combustion stage is elevated in temperature and pressure while being maintained at near constant volume during combustion.

With these and other objects in view, which will become apparent to one skilled in the art as the description proceeds, this invention resides in the novel construction, combination, arrangement of parts and method substantially as hereinafter described, and more particularly defined in the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Since the efficiency of a turbine engine is directly related to the temperature at which heat is added, turbine engines can be made more efficient by increasing pressure, and therefore temperature, at combustion and/or by constraining the fluid during the combustion process.

Figure 1:
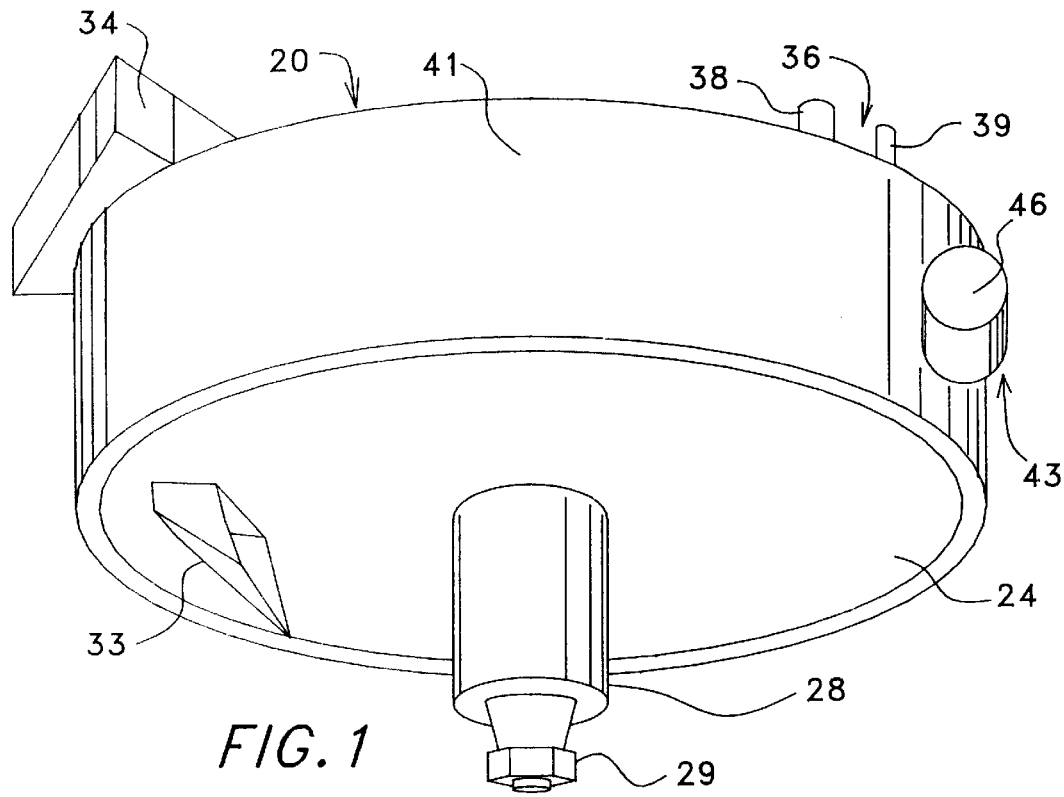
FIG. 1 is a perspective view of the turbine engine of this invention having a single stator-rotor-stator assembly.
Figure 2:
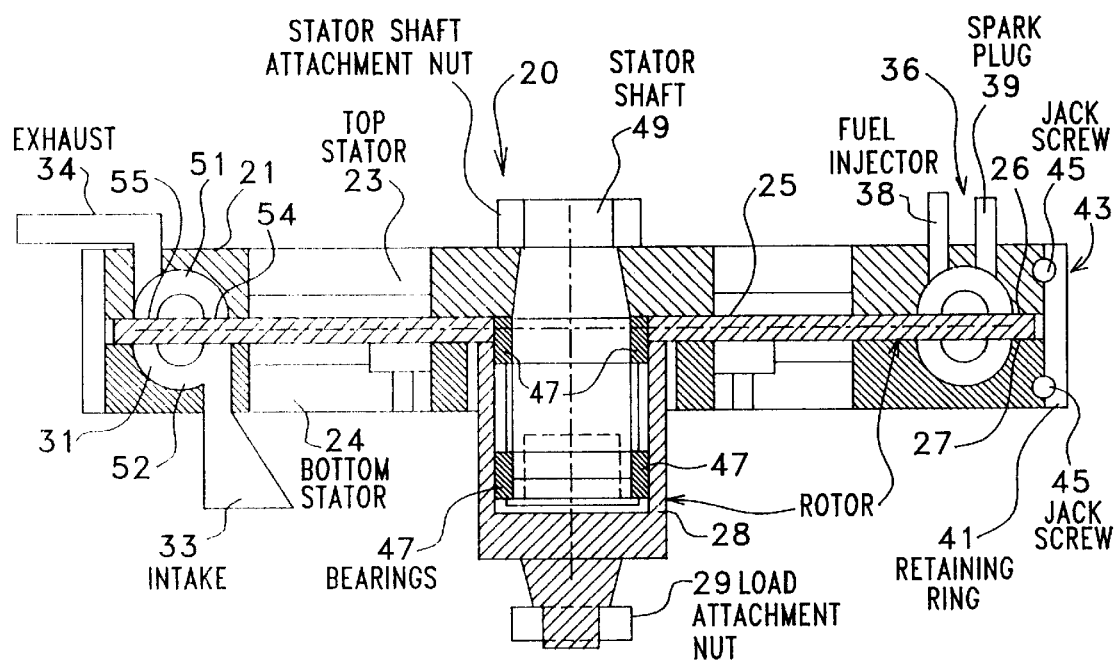
FIG. 2 is a side sectional view of the turbine engine shown in FIG. 1.

Improved and efficiency enhanced turbine engine 20 is shown in FIGS. 1 through 9. As best shown in FIG. 2, ,engine 20 now preferably includes a single stator-rotor-stator assembly 21, and as best shown in FIGS. 1 and 2, the engine is small and compact with low mass.

As also best shown in FIG. 2, turbine engine 20 includes top stator 23, bottom stator 24, and rotor 25 positioned between the top and bottom stators, with rotor top plate 26 and rotor bottom plate 27 being positioned at the opposite sides of the rotor. Rotor 25 also has a hub 28 connected therewith and constrained to rotation therewith, with the hub being connectable with a conventional output drive through load attachment nut 29.

A fluid flow path 31 is established through the turbine engine, with fluid being inserted into the path through fluid inlet, or intake, 33 and discharged from the path through fluid outlet, or exhaust, 34. Combustion producer 36 is provided at top stator 23 and, as indicated, may include a fuel inserter, or injector, 38 and an ignitor 39.

As also best indicated in FIG. 2, rotor 25 is preferably a flat rotor disk (the disk may be ceramic) positioned between top and bottom stators 23 and 24 (stators 23 and 24 may also be disks) and the stator disks are maintained in spaced relationship with respect to one another by a retaining ring 41. Spacing between the stator disks is controlled by spacing control 43, shown to include jack screws 45 (in FIG. 2) controlled by a gap control drive 46 (in FIG. 1).

In the embodiment of the invention as shown in FIGS. 1 through 9, rotor 25 is the only part that moves at engine speeds. As shown in FIG. 2, rotor 25 is mounted on two internal high speed bearings 47 that provide the rotational axis. The bearings are supported by stationary stator shaft 49 which may be integrally formed with top stator 23 or otherwise attached to the top stator. The vertical position of the rotor is supported by air bearing operation of the rotor disk top and bottom surfaces.

Fluid flow path 31 is shown in FIG. 2 to include a first portion 51 that extends through top stator 23, a second portion 52 that extends through bottom stator 24, and third and fourth portions 54 and 55 that extend through different areas, or portions, of rotor 25.

Figure 3:
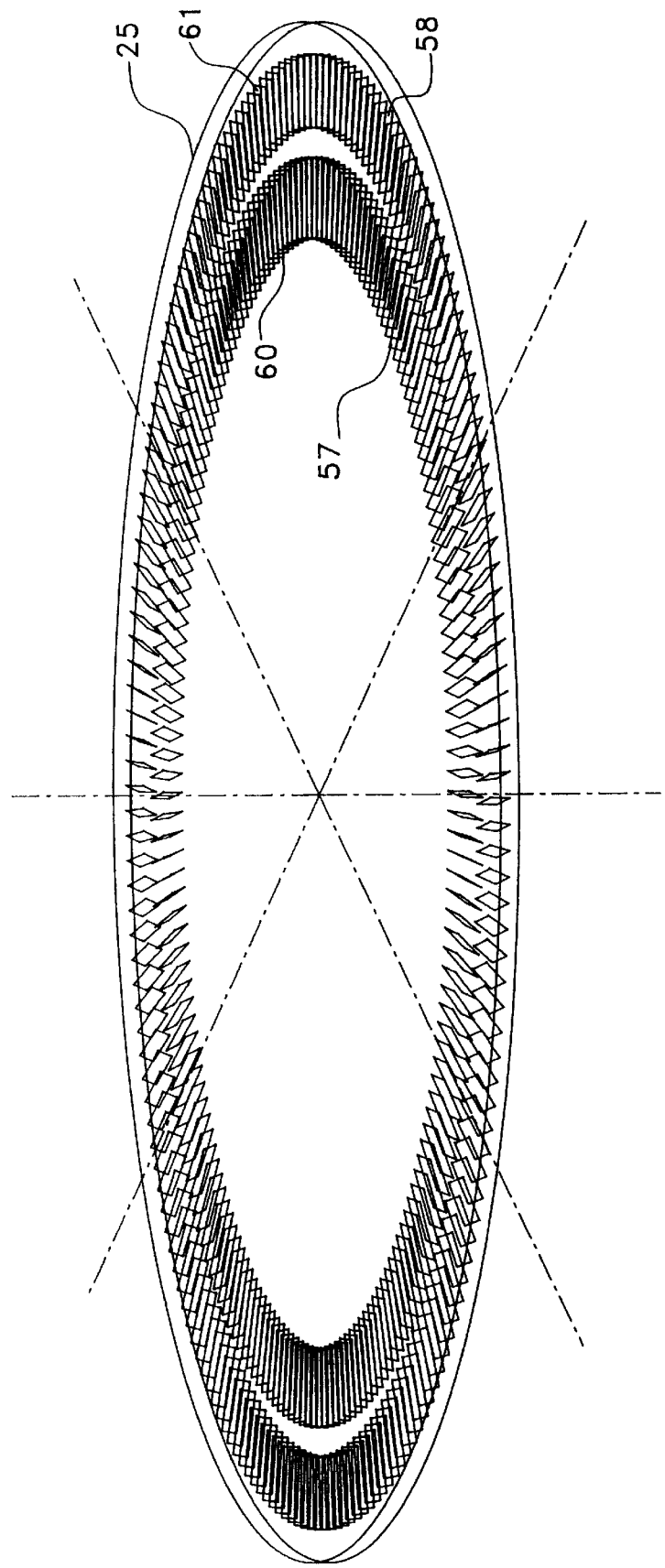
FIG. 3 is a perspective view of the rotor shown in FIG. 2.
Figure 4:
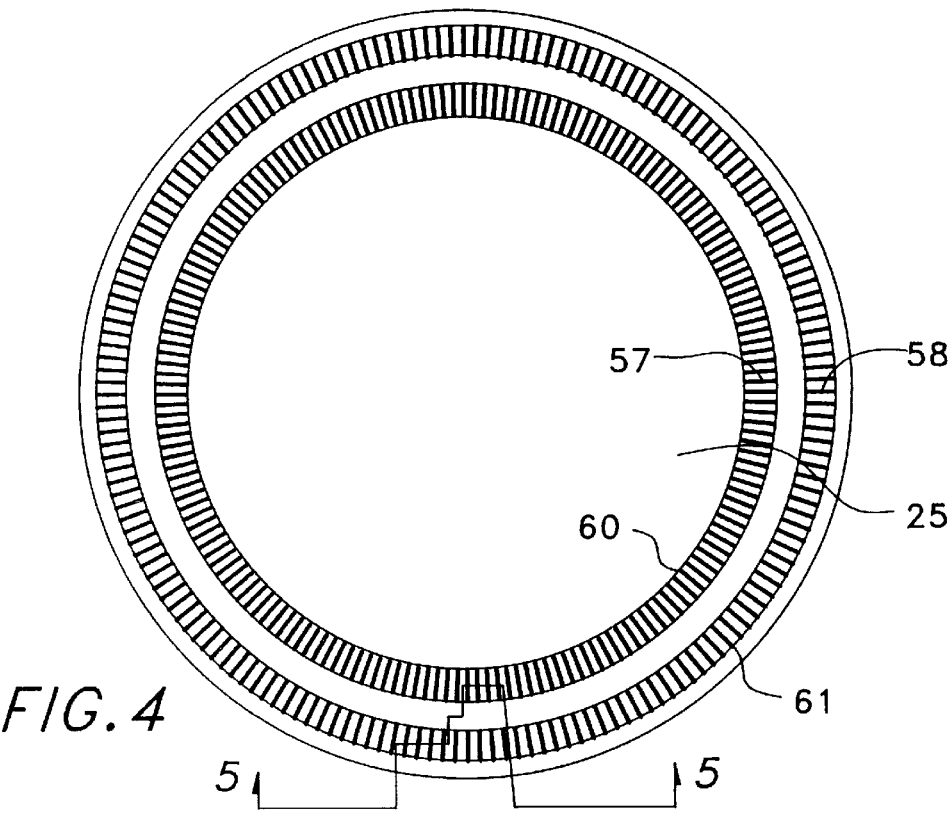
FIG. 4 is a top view of the rotor shown in FIGS. 2 and 3.

As indicated in FIGS. 3 and 4 (FIG. 3 being a semi-transparent trimetric perspective view illustrating only the outer peripheral portion of the rotor and FIG. 4 being a top view also illustrating only the outer peripheral portion of the rotor), rotor 25 has two groups 57 and 58 of turbine blades therein with the blades being disposed in inner and outer rings 60 and 61 near the outer periphery of the rotor so that each group of turbine blades passes through different ones of third and fourth paths 54 and 55.

Figure 5:
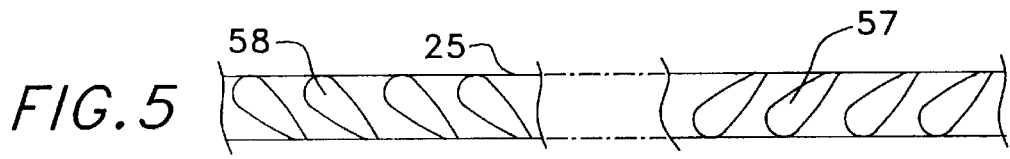
FIG. 5 is a cross-sectional view of the rotor taken through lines 5—5 of FIG. 4.

The turbine blades are configured, or shaped, as indicated in FIG. 5, to react to fluid flow and provide an impediment to fluid flow unless the blades are notated. The opposite ends, or edges, of each of the turbine blades are mounted on, and attached to, top and bottom plates 26 and 27 to reduce stress levels, with turbine blade group 57 (at inner ring 60) being mounted at an angle so that upward circumferential flow through portion 54 of fluid flow path 31 drives the rotor in a clockwise direction, and with turbine blade group 58 (at outer ring 61) being mounted at an angle opposite to the angle used to mount turbine blade group 57 so that downward circumferential flow through portion 55 of fluid flow path 31 also drives the rotor in the clockwise direction.

In the single stator-rotor-stator assembly embodiment of the turbine engine (as shown in FIGS. 1 through 9), an entire engine cycle, including compression, combustion, and expansion, occurs continuously and/or intermittently during each revolution of the rotor. Fluid (normally air) flow through the top and bottom stators is best indicated by arrows in FIGS. 6 and 7, and the combined flow is best indicated by arrows in FIG. 8, with FIG. 8 also specifically indicating compression stage 63, combustion stage 65, and expansion stage 67 in relationship with fluid flow from intake 33 to exhaust 34.

Figure 6:
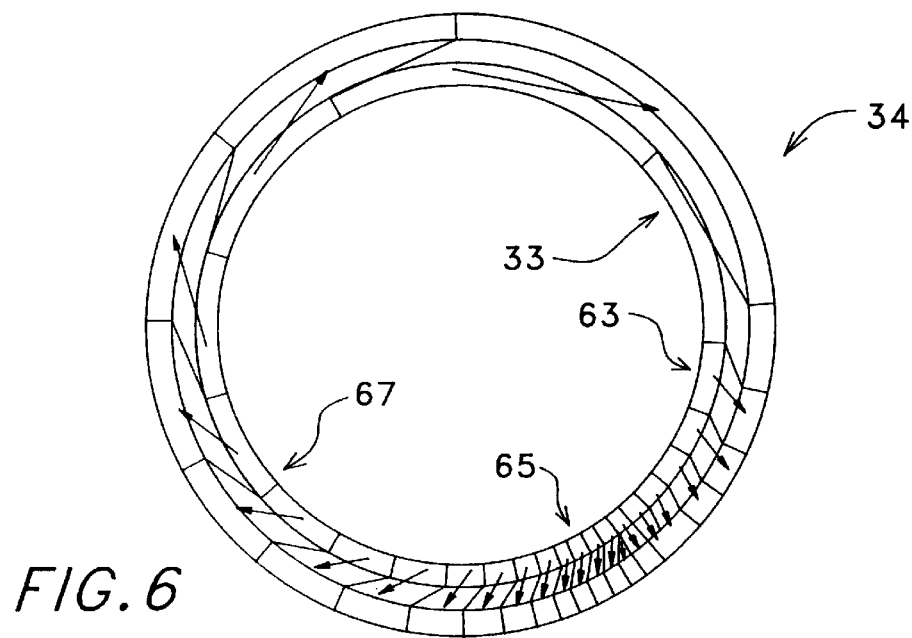
FIGS. 6 and 7 are top views of the top and bottom plates, respectively, of the rotor shown in FIG. 2.
Figure 7:
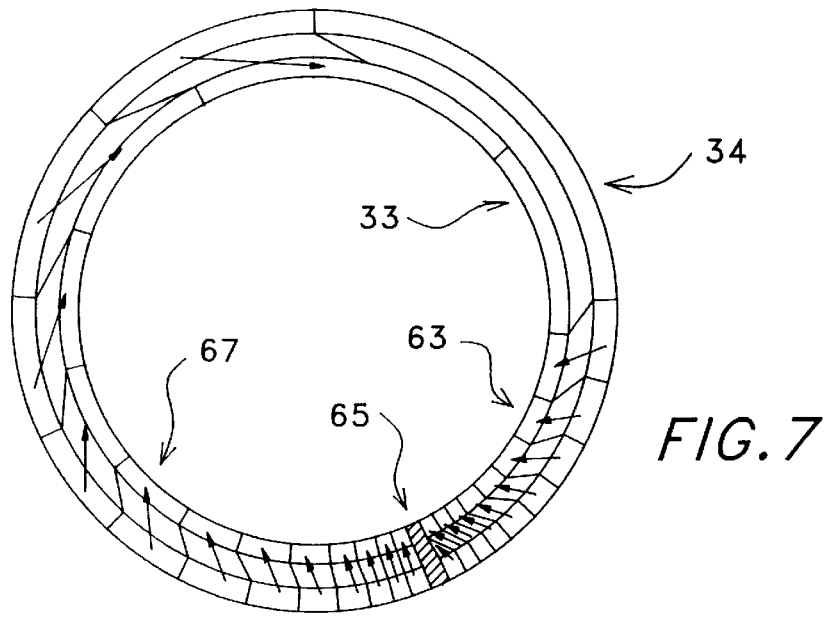

Fluid flow enters the engine at intake 33 at bottom stator 24 and flows upward through the inner ring, or portion, 54, of rotor 25 continuing in a spiral pattern in the circumferential direction through top stator 23 forward and downward through the outer ring, or portion, 55 of rotor 25, and then forward and upward through bottom stator 24. The progress of the fluid is in a spiral with flow in the circumferential direction outwardly in top stator 23, as indicated in FIG. 6, and inwardly in bottom stator 24, as indicated in FIG. 7.

Figure 8:
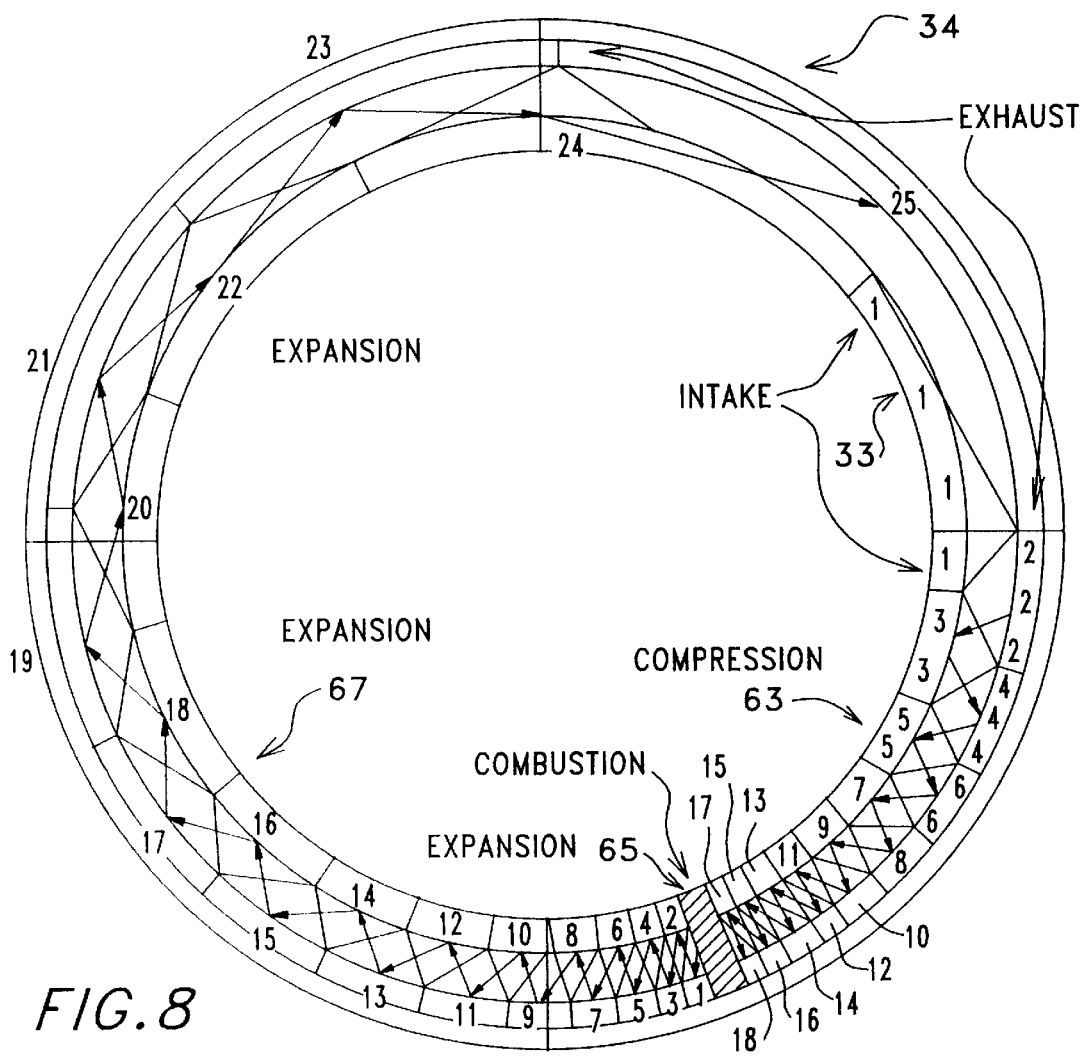
FIG. 8 is a simplified top view sketch illustrating fluid flow through the rotor and top and bottom stators shown in FIG. 2.

The combined flow, as indicated in FIG. 8, is upward at the intake (marked 1), downward (marked 2) on the outer ring, upward (marked 3) and so on through the compression stage in the circumferential direction and with ever increasing compression and pressure toward the combustion stage. After the combustion stage, expansion progresses in the expansion stage in a similar manner through progressively larger passages, as indicated in FIG. 8, until the fluid is exhausted through the exhaust port.

While not specifically shown, it is meant to be realized that appropriate valving could be utilized in the top and/or bottom plates of the rotor to control fluid flow and/or cause fluid by-pass where needed.

During both compression and expansion, the fluid flow is kept to the lowest practical velocities in order to keep the passages as large as possible. An aerodynamic calculation illustrates the above features of fluid (air) flow and these calculations show that under conditions wherein flow through the turbine is at a low constant velocity in the normal direction for compression and less than 200 meters per second in the expansion process, the area of the flow passage is proportional to the volumetric compression.

For a given inlet area and fixed flow velocity, there is a point in a continuous compression process, in which the volume of the flow is the same as the free volume within the rotor, i.e., the volume between the blades times the velocity of the blades is equal to the flow volume. With appropriate design choices, that condition arrives at the same point of the flow in which the desired compression ratio is achieved.

Figure 9:
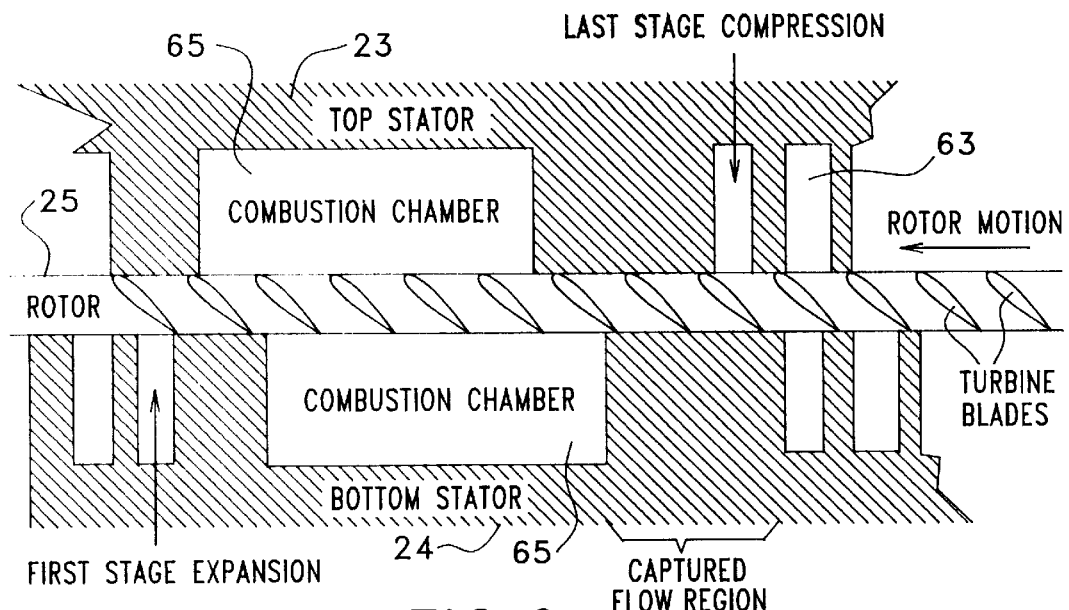
FIG. 9 is an enlarged partial side view illustrating the rotor and stators with a captured flow region between the compression and combustion stages.

FIG. 9 illustrates that fluid flow can then be swept into a captured, or confined, flow region by the motion of the rotor. In the confined flow region, the stators fit the rotor and the blades sufficiently tightly so as to prevent the trapped fluid (air) from leaking out at any substantial rate. This confined region also separates the combustion process from the compression process so that any desired combustion process can be utilized without generating back flow of additional loading of the compressor stage.

Near constant volume combustion can be achieved by causing combustion to occur, such as by injection of fuel and ignition, during the time the flow is trapped between the blades, or, if slower combustion is desired, as indicated in FIG. 9, after the confined region the passage can be expanded into a combustion chamber having a cross section as required to achieve the desired combustion time.

In the embodiment of this invention utilizing a single stator-rotor-stator assembly (as shown in FIGS. 1 through 9), there are four surfaces requiring special precision in fabrication. The top and bottom of the rotor and the interfacing surfaces of the top and bottom of stators must be air bearing precision flat, and must be stiff enough to maintain that flatness in the region near the combustion process over time and temperature. The significance of the problem is reduced by the fact that the flat rotor disk has a short dimensional path (about 1 cm) and the area under high pressure is very small (roughly 40 cm$^2$ or six square inches in a 100 HP design).

By providing forward threads on the outer edge of top stator 23 and reverse threads on bottom stator 24, the gap between the stators and the rotor can be reduced to air bearing clearances by rotating the retaining ring. Rotation of the retaining ring relative to the stators in one direction will bring the stators closer together, and rotation in the opposite direction will increase engine clearances.

By use of jack screws 45, as shown in FIG. 2, and gap control 46, as shown in FIG. 1, retaining ring motion during operation is made practical. By this means, the only critical engine tolerance, i.e., clearance between the rotor and stators, can be adjusted over the life of the engine to compensate for wear, and during operation to provide higher performance if desired. The remainder of the tolerances in the engine do not significantly affect performance and may therefore utilize standards common to the engine industry.

The outlet of the combustion stage can pass through a second confined region, or could be ported directly into the exhaust turbine. As long as some flow is allowed from the combustion process into the exhaust turbine, the engine will generate torque at zero speed. The low speed torque is limited by the low compression state of the flow presented to the combustion process, but still is a substantial portion of the energy available from a constant volume combustion process at any effective compression ratio/speed. At low speed, the compression stage generates very little pressure, and thus requires little energy, and since frictional losses are low, essentially all of the available torque is shaft output power.

In low compression engines, a compromise engine clearance setting can be utilized over a number of cycles of engine use. For engines operating at high compression ratios, compressor stall during engine start is a significant problem. Compressor stall arises because the latter stages of the compressor cannot achieve the required mass flow until high pressures are achieved at high speed. At low speed, the mass flow capabilities of the low pressure stages exceeds that of the latter stages and the early stages of the compressor stall preventing further pressure rise.

Active gap control (such as can be provided, for example, by automatically controlling gap drive 46, such as, for example, by use of a computer program or a timer) can overcome this difficulty by loosening the engine clearances during startup and at low engine speed. The loose engine clearances will allow the excess flow capacity to be dissipated through leakage thereby preventing compressor stall. As the speed and pressure rise, increasing the mass flow capabilities of the latter portion of the compressor, the clearances can be progressively tightened to achieve optimum performance.

The embodiment of the invention, as shown in FIGS. 1 through 9, is simple, having only four major components, four precision flat surfaces, and simple accessories, as well as being light in weight (about 75 pounds for a 100 HP engine. The engine also has an estimated practical thirty percent thermodynamic advantage over the best known engine's today operating at the same compression ratio, very low frictional losses, continuous torque, zero speed torque, low turbine stress, material thermal advantages, and fabrication simplicity.

The thermodynamic advantage arises from near constant volume combustion and expansion back to ambient pressure, and the very low frictional losses arise from use of air bearing seals. The engine is inherently balanced and can provide continuous torque from a single combustion chamber requiring only a single fuel injector and ignitor.

The confined flow region separating the combustion chamber from the compressor also has an effect on the nature of the engine cycle including generation of significant zero speed and low speed torque. At low speed, the compressor requires little energy, thus with low frictional losses essentially all of the available torque is shaft output power.

The turbine blades experience all portions of the engine operation cycle and thus operate at the average flow temperature (rather than the peak flow temperature typical of now known turbine engines). Since the blades are supported at both ends, the only critical dimension, the sealing dimension, is both small and adjustable. The small size of the dimension and the few parts involved in creating the dimension provide for stability over both temperature and time, and adjustability greatly simplifies fabrication (the final finish on the air bearing surfaces can be achieved by wear in during initial operation).

An improved and efficiency enhanced turbine engine can also be realized using plural stator-rotor-stator assemblies, particularly with respect to providing valving to prevent back flow of pressure from the combustion stage to the compressor stage, constraining of fluid at the combustion stage to effect near constant volume during combustion, passage of fluid through the rotor of one or more of the plural stator-rotor-stator assemblies a plurality of times, and/or using an intermittent exposure controller for achieving intermittent exposure of surfaces to high temperature flows.

Figure 10:
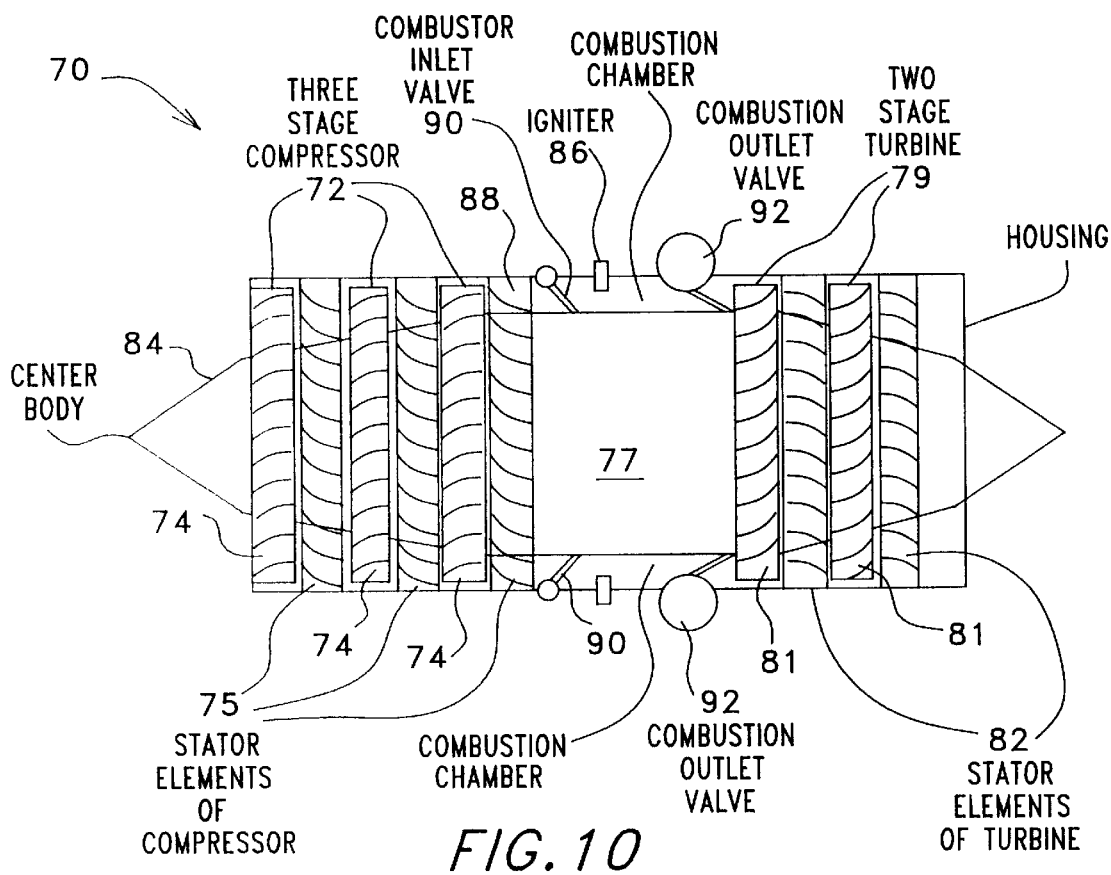
FIG. 10 is a cut-away side view of a turbine engine having a plurality of stator-rotor-stator assemblies with valving associated therewith.

In the embodiment of the invention shown in FIG. 10, turbine engine 70 has a plural (three as shown) stage compressor, or compression stage, 72 having rotors 74 and stators 75, a combustor, or combustion stage, 77, and a plural (two as shown) turbine 79 having rotors 81 and stators 82, along with a center body 84, a combustion producer, or ignitor, 86, and a housing 88. A combustion inlet valve 90 is also shown, as a combustion outlet valve 92.

Combustion inlet valve 90 allows fluid flow from compressor 72 to combustor 77 when the compressor pressure exceeds that of the combustor, and prevents reverse flow from combustor 77 to compressor 72 when the pressure at the combustor exceeds that of the compressor, as occurs during combustion. This allows high usable pressures at the combustor and results in greater operating efficiency.

Combustion outlet valve 92, where utilized, is controlled to close immediately prior to ignition to constrain the fluid at the combustor to a near constant volume during combustion (in conjunction with closing of combustor inlet valve 90 to prevent back flow of fluid when the pressure at the combustor exceeds that of the compressor). This allows a rise in temperature and pressure above that available using only the combustor inlet valve. Closing combustion outlet valve 92 prior to closure of inlet combustion valve 90 also provides acoustic enhancement of the combustion pressure.

Figure 11:
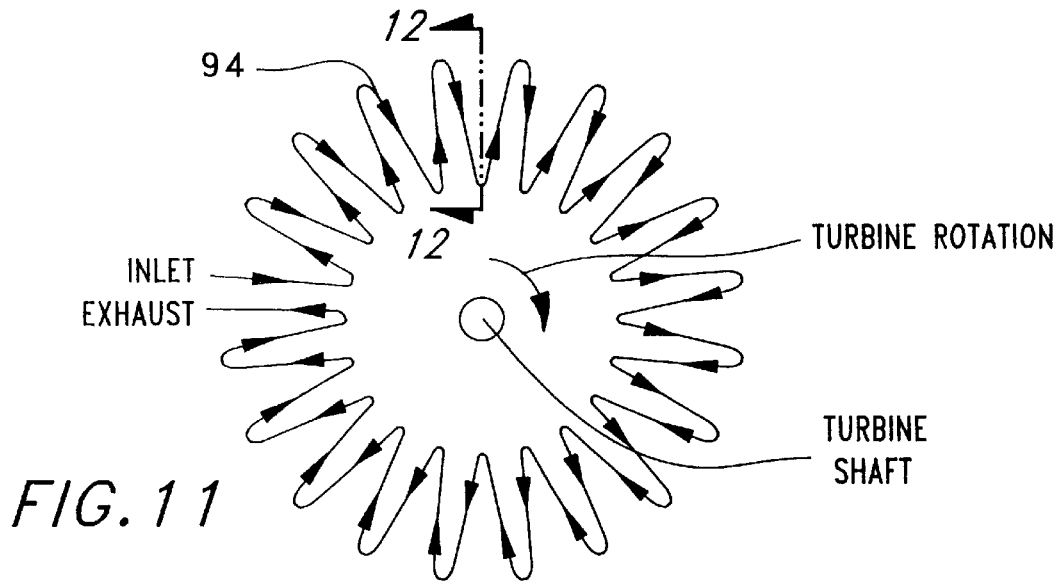
FIG. 11 is an end view fluid flow illustration of the turbine engine shown in FIG. 10 wherein fluid passes through the rotor a plurality of times.
Figure 12:
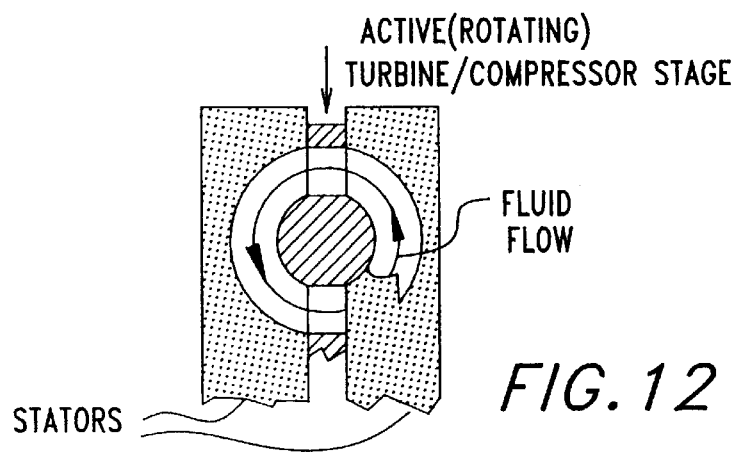
FIG. 12 is a cross-sectional view taken through lines 12—12 of FIG. 11.

In addition, or as an alternative, to valving, as indicated in FIG. 10, one or more of the stator-rotor-stator assemblies shown in FIG. 10 can have a fluid flow path 94 configured to cause the fluid to pass through the rotor a plurality of times, as is indicated in FIGS. 11 and 12. As shown by the arrows in FIGS. 11 and 12, the fluid is caused to flow in a spiral in the circumferential direction around the axis of the engine (i.e, the fluid flow passes through the plane of the active stage a plurality of times encountering the same active stage a plurality of times). As can be appreciated, each of the rotors could be fabricated as a single rotor with blades trapped between stator plates and still provide multiple stages of compression and power delivery.

By intermittent exposure of surfaces to different temperature flows to thus reduce the overall average temperature to which exposed surfaces are subjected and thus enable use of higher temperatures than would otherwise be possible with the same materials if subjected only to high temperatures, such as combustion chamber outlet temperatures, the efficiency of a turbine engine can be enhanced. Intermittent exposure can be effected by using at least one of intermittent combustion, use of flow diversion by using flow exchange valves to intermittently exchange passage of hot and cooler bypass temperatures through the engine, and mixed flow achieved by circumferential separation.

Figure 13:
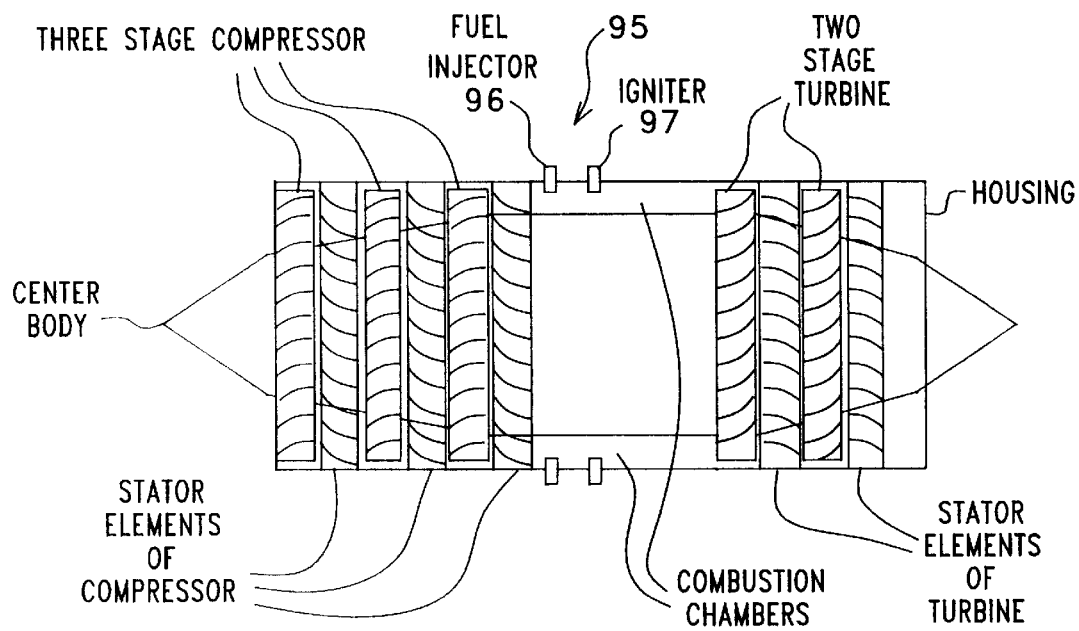

Intermittent combustion can be achieved, as shown in FIG. 13, through use of a combustion producer 95, shown as a fuel injector 96 and an ignitor 97, in a turbine engine 70 such as shown in FIG. 10 (with or without the valving as shown therein). Interruptions in ignition cause termination of combustion, and this results in cooler working fluid flow.

Figure 14:
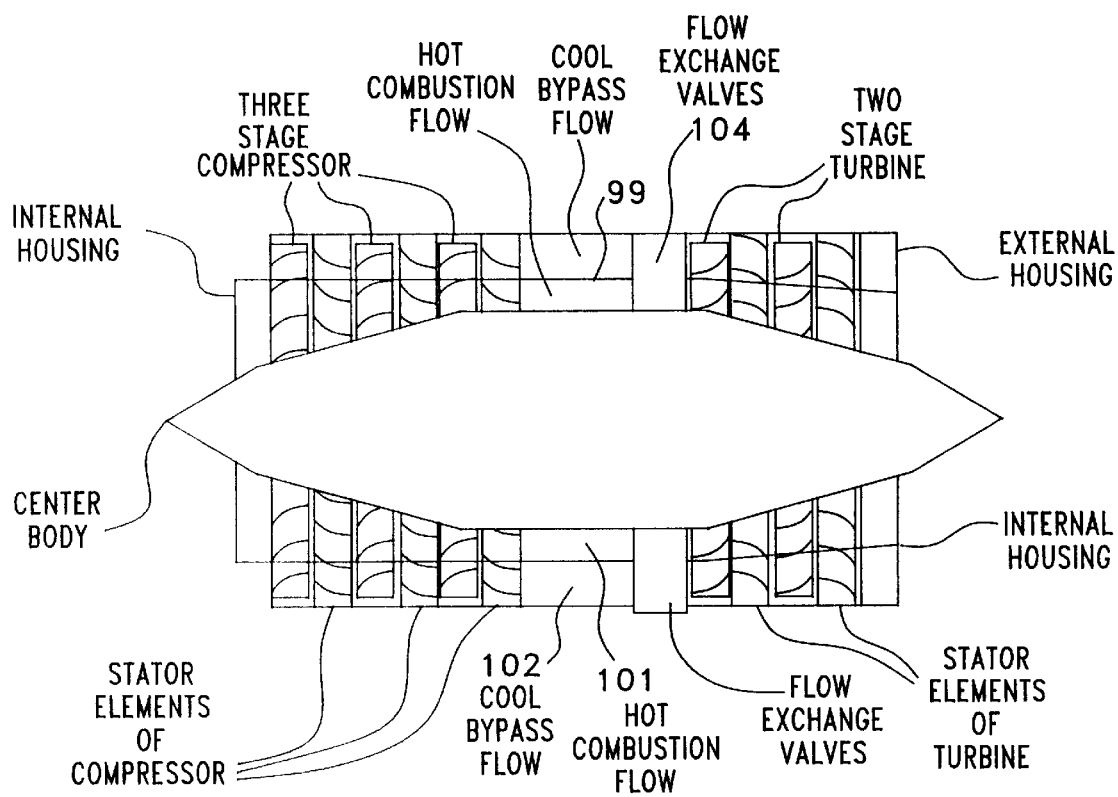

Flow diversion can also be achieved, as shown in FIG. 14, through use of flow exchange valves to intermittently exchange the paths of the heat conductive flow and the cool bypass flow as they pass through the engine. As shown in FIG. 14, the hot and cooler flows are radially separated from one another through use of internal housing 99 (separating the combustion flow 101 from the cooler bypass flow 102) and flow exchange valves 104.

The flow exchange valves provide either straight through flow by maintaining the hot flow through the inner portion and the cooler flow through the outer portion of the exhaust turbine, or exchanged flow in which the hot combustion flow is through the outer portion of the exhaust turbine and the cool flow is through the inner portion of the turbine.

Intermittent operation of the exchange valves provides mixed flow through substantially all of the exhaust turbine and thereby provides that all of the surfaces in the exhaust turbine operate at a low average temperature while allowing a very high temperature combustion. In this embodiment, the bypass section of the compressor is matched to the pressure at the outlet end of the combustion chamber, thereby providing very low operating pressure differentials to the flow exchange valves.

Figure 15:
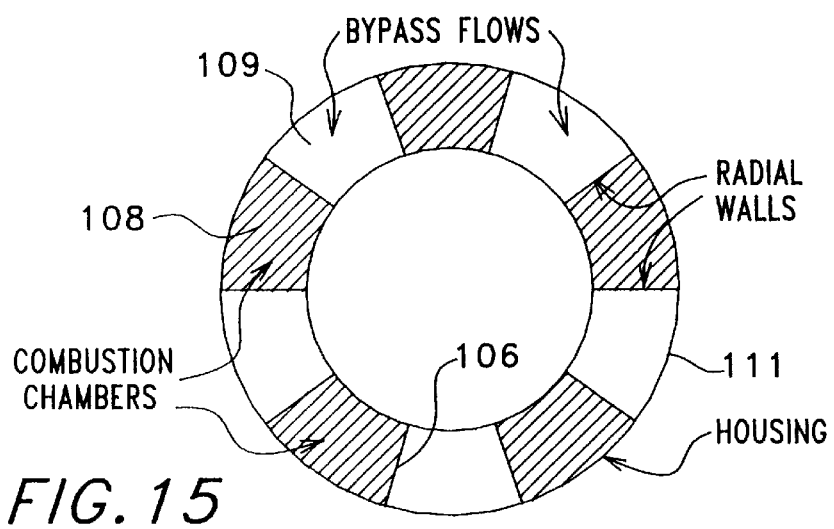
FIGS. 13 through 15 are cut-away side views (FIGS. 13 and 14) and end view (FIG. 15) of a turbine engine such as shown in FIG. 10 but illustrating use of intermittent combustion (FIG. 13), flow diversion (FIG. 14), and mixed flow using circumferential separation (FIG. 15).

Mixed flow can also be achieved by circumferential separation of hot and cooler flows as indicated in FIG. 15. As shown, radial walls 106 allow combustion flow 108 and cooler bypass flow 109 in parallel to one another along the same annular ring 111. Since the motion of the turbine blades is in the circumferential direction, the blades pass from a high temperature flow to a cooling flow several times per revolution. Thus, the rotating elements of the turbine experience a low average temperature, even in the intermittent presence of very high temperature combustion. While this does not cool the stator elements, the stators operate at lower stress levels and therefore are better able to withstand the high temperatures.

As can be appreciated from the foregoing, this invention provides an improved turbine engine having enhanced efficiency and an improved method for providing enhanced efficiency in a turbine engine.

What is claimed is:

1. A method for providing enhanced efficiency in a turbine engine having compression, heat addition, and expansion stages, said method comprising:

providing a rotor having blades capable of containing fluid therebetween;

providing at least one stator adjacent to said rotor and having a plurality of chambers for receiving fluid therein with said chambers effectively progressively varying in size with respect to the direction of rotation of said rotor; and providing a fluid flow path through at least the compression and heat addition stages and having a pressure difference existing during normal operation between the compression and heat addition stages, with fluid in said fluid flow path extending between said at least one stator and said rotor, and with fluid in said fluid flow path at said rotor contained between said blades of said rotor being transferred between the compression and heat addition stages and encountering said plurality of chambers in said at least one stator upon rotation of said rotor.

2. The method of claim 1 wherein said step of providing a rotor having blades capable of containing fluid therebetween enables maintaining said fluid at the heat addition stage at near constant volume during heat addition.

3. The method of claim 1 wherein said step of having a pressure difference existing during normal operation between the compression and heat addition stages includes utilization of at least one of configuration of said fluid flow path, impediment of said fluid flow path, and valving at said fluid flow path.

4. The method of claim 1 wherein said method includes causing combustion at the heat addition stage by providing fuel at the combustion stage and igniting said fuel at said heat addition stage.

5. The method of claim 1 wherein said method includes providing a single stator-rotor-stator assembly having the compression, heat addition, and expansion stages therein, and providing said fluid flow path through said assembly.

6. The method of claim 5 wherein said method includes providing a flat rotor disk in said single stator-rotor-stator assembly.

7. The method of claim 1 wherein said method includes passing said fluid through said rotor a plurality of times.

8. The method of claim 7 wherein said step of providing a rotor having blades includes providing dual groups of blades on said rotor, and wherein said method includes passing said fluid through said rotor in opposite directions to contact different ones of said dual groups of blades when passing through said rotor in said opposite directions.

9. The method of claim 1 wherein said method includes moving said fluid in a circumferential direction through said compression and heat addition stages.

10. The method of claim 1 wherein said method includes providing intermittent exposure of engine components to different temperatures during operation.

11. The method of claim 1 wherein said step of providing at least one stator adjacent to said rotor includes providing first and second stators adjacent to and at opposite sides of said rotor, and wherein said method includes passing said fluid through a first portion of said fluid flow path extending through said first stator, passing said fluid through a second portion of said fluid flow path extending through said second stator, and passing said fluid through third and fourth portions of said fluid flow path extending through said rotor with said fluid passing through said third portion of said fluid flow path being in the direction opposite to the direction of fluid passing through said fourth portion of said fluid flow path whereby said fluid moving along said fluid flow path passes through said rotor a plurality of times.

12. A method for providing enhanced efficiency in a turbine engine having compression, heat addition, and expansion stages, said method comprising:

providing first and second stators spaced from one another and a rotor positioned between said first and second stators with said rotor and said first and second stators extending through at least the compression and heat addition stages and said rotor having first and second groups of rotor blades with said groups positioned radially adjacent to one another on said rotor;

providing a fluid inlet and a fluid outlet; and providing a fluid flow path extending through said rotor and said first and second stators between said fluid inlet and said fluid outlet with fluid flow through said fluid flow path including fluid flow from said first stator to said second stator through said rotor and engaging said first group of rotor blades when passing through said rotor and with fluid received by said second stator from said first stator through said rotor being caused to thereafter flow back to said first stator through said rotor and engaging said second group of rotor blades when passing through said rotor.

13. The method of claim 12, wherein said step of providing fluid flow through said fluid flow path includes passing said fluid through first and second portions of said fluid flow path in different ones of said first and second stators and passing said fluid through third and fourth portions of said fluid flow path in said rotor with said third and fourth portions of said fluid flow path having different ones of said first and second rotor blades therein whereby said rotor is rotated by fluid passing along said third and fourth portions of said fluid flow path.

14. The method of claim 12 wherein at least the compression and heat addition stages have pressure established therein during normal operation, and wherein said method includes substantially precluding the pressure at the heat addition stage from flowing to the compression stage by at least one of fluid flow path configuration, rotor blades in the fluid flow path, and valving at the fluid flow path.

15. The method of claim 12 wherein said method includes constraining said fluid flow path whereby fluid at the heat addition stage is elevated in temperature and pressure such that said elevated pressure is above a pressure at the outlet of the compression stage and such that said fluid is maintained at near constant volume during heat addition at the heat addition stage.

16. A method for providing enhanced efficiency in a turbine engine having compression, heat addition, and expansion stages, said method comprising:

providing a rotor extending through at least the compression and heat addition stages;

providing first and second stators at opposite sides of said rotor with said first and second stators also extending through at least the compression and heat addition stages;

providing a fluid flow path extending through said rotor and said first and second stators a plurality of times; and controllably adjusting operational spacing between said first and second stators as needed to enhance efficiency of the turbine engine.

17. The method of claim 16 wherein said step of adjusting operational spacing between said first and second stators includes adjusting of said spacing during normal operation of said turbine engine.

18. The method of claim 16 wherein said steps of providing said first and second stators and said rotor includes providing first and second stator disks and a rotor disk, and wherein said step of adjusting operational spacing between said first and second stators includes providing a movable ring surrounding said stator and rotor disks and utilizing said movable ring to position said stator disks relative to one another.

19. The method of claim 18 wherein said step of adjusting operational spacing between said first and second stators includes providing a gap control drive for adjusting the spacing between said stator disks.

* * * * *